(12) United States Patent
Richardson

(10) Patent No.: US 6,219,753 B1
(45) Date of Patent: Apr. 17, 2001

(54) FIBER CHANNEL TOPOLOGICAL STRUCTURE AND METHOD INCLUDING STRUCTURE AND METHOD FOR RAID DEVICES AND CONTROLLERS

(75) Inventor: Thomas E. Richardson, Golden, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/326,504

(22) Filed: Jun. 4, 1999

(51) Int. Cl.[7] ................................................. G06F 12/00
(52) U.S. Cl. ................... 711/114; 711/4; 714/6; 335/441; 335/182.04
(58) Field of Search .......................... 711/114, 4; 714/6, 714/710, 711; 395/441, 182.04

(56) References Cited

U.S. PATENT DOCUMENTS 5,526,507 * 6/1996 Hill ....................................... 395/441
5,588,110   12/1996 DeKoning et al. ............. 395/182.03
5,948,110 * 9/1999 Hitz et al. ................................ 714/6

FOREIGN PATENT DOCUMENTS 0 550 853 A2   7/1993 (EP) ................... G06F/11/20
WO 97/07458   2/1997 (WO) .............. G06F/11/10
WO 98/21657   5/1998 (WO) ............... G06F/11/20

OTHER PUBLICATIONS

Oct. 29, 1999, PCT International Search Report; US99/12534.

Ng, "Crosshatch disk array for improved reliability and performance" (IBM Research Division, San Jose, California; 1994 IEEE, pp.255–264).

Kembel, "In–depth fibre channel arbitrated loop", Ch. 2, Port bypass circuit (pp. 42–43); Ch. 15, High–availability loops (pp.269–282) (Solution Technology, copyright 1996, 1997).

* cited by examiner

Primary Examiner—Do Hyun Yoo
Assistant Examiner—Mehdi Namazi
(74) Attorney, Agent, or Firm—Flehr Hohbach Test Albritton & Herbert

(57) ABSTRACT

System, apparatus and method for interconnecting computer devices define an interconnect topology maximizing performance and device availability in the event of a communication channel failure. Structure and method are particularly relevant and beneficial to a computer RAID disk interconnection topology for Fibre Channel connections to improve RAID array performance and data availability, but is not limited to such RAID systems, and other devices may be interconnected according to the structure and method of the invention. A topology having multiple dual-ported controllers configured in a tube topology is provided for a switchable configuration having a plurality of channels and an plurality of controllers arranged in a tube topology or structure. In the event of a channel failure for this structure, the load will be evenly distributed to the remaining controllers. One embodiment provides a data storage system having a plurality of storage devices each having first and second access ports, a plurality of communication channels, a controller controlling access by the plurality storage devices to the plurality of channels, where at least one of the devices is connected via the first access port to a first one of the channels and via the second access port to a second one of the channels, so that the one device may be accessed by the controller via either the first or second channels channel. Mathematical relationships between the and minimum number of devices for an automatically balanced system and the number of channels are described.

30 Claims, 11 Drawing Sheets

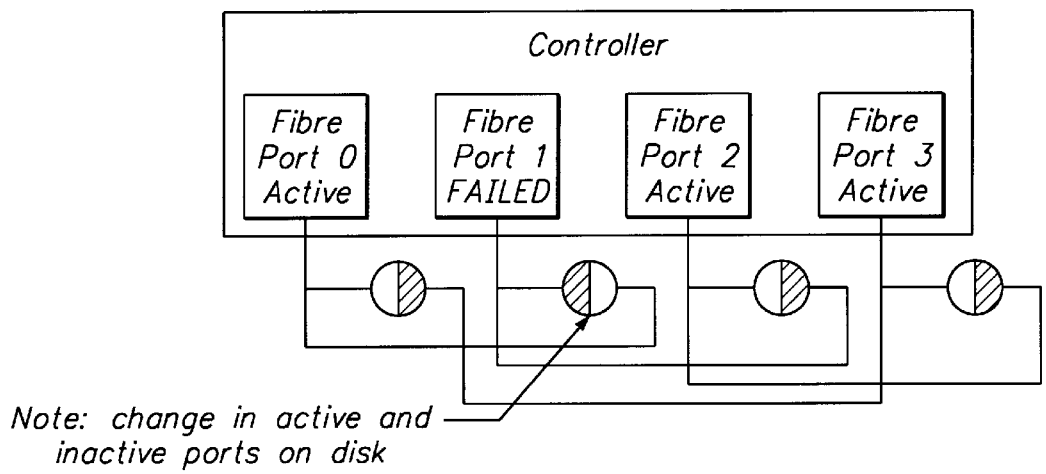
FIG. 4 Channel Protected Model with Failed Channel
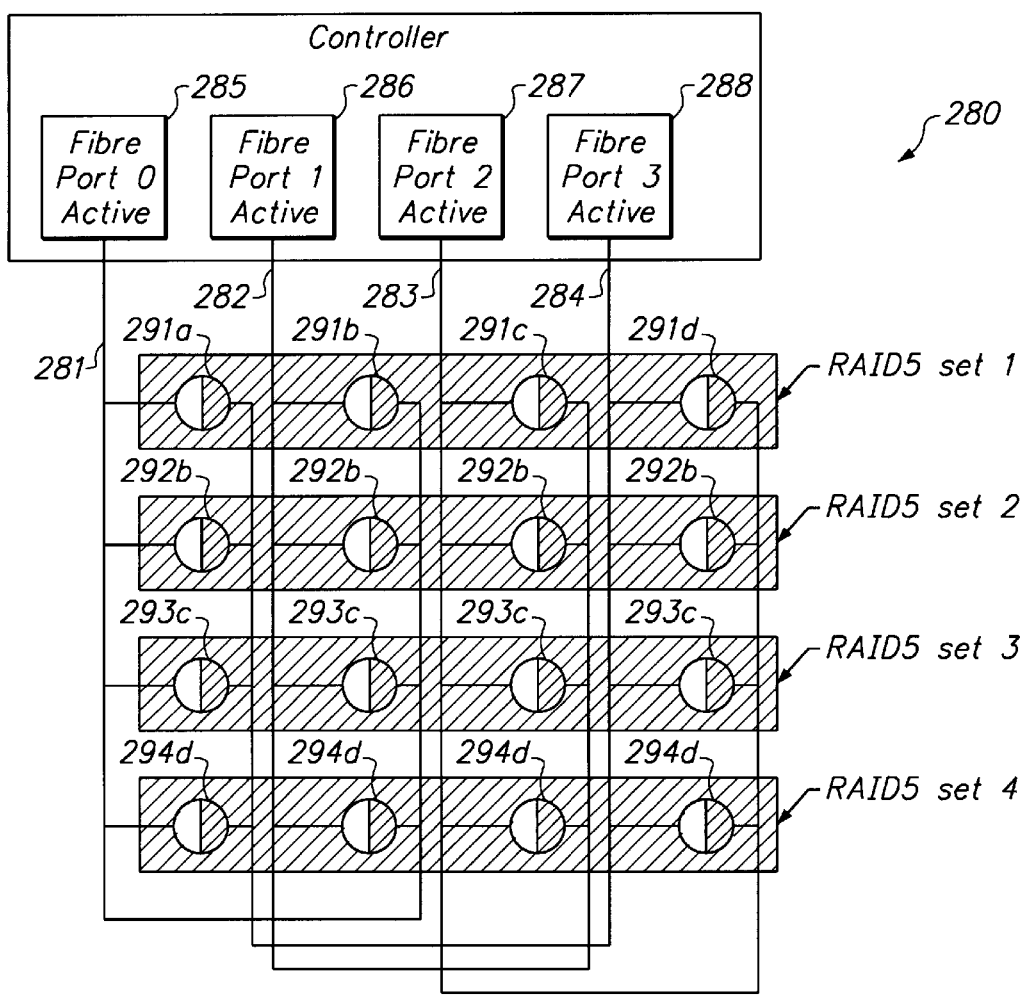
FIG. 6 RAID5 Loop Topology FIG. 7A  Combined RAID3 and RAID5 Loop Topology FIG. 7B   Alternative Combined RAID3 and RAID5 Loop Topology

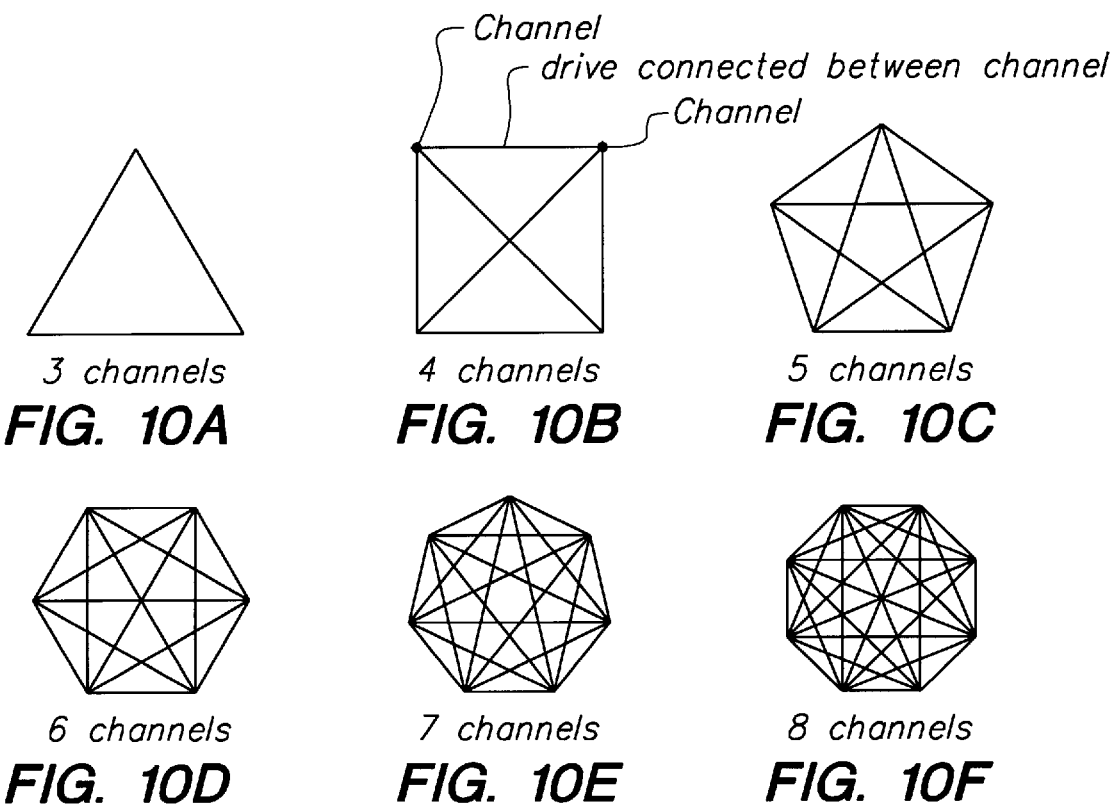
3 channels
FIG. 10A
4 channels
FIG. 10B
5 channels
FIG. 10C
6 channels
FIG. 10D
7 channels
FIG. 10E
8 channels
FIG. 10F
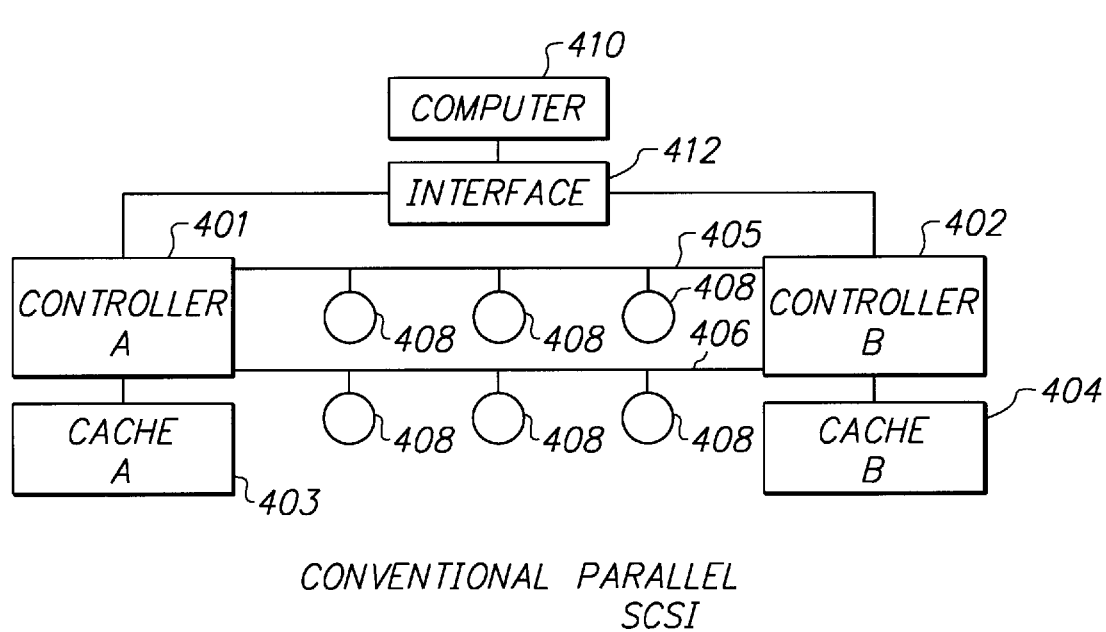
CONVENTIONAL PARALLEL SCSI
FIG. 13

FIBER CHANNEL TOPOLOGICAL STRUCTURE AND METHOD INCLUDING STRUCTURE AND METHOD FOR RAID DEVICES AND CONTROLLERS

FIELD OF THE INVENTION

This invention pertains generally to apparatus, system, and method for interconnecting computer device s to define an interconnect topology that maximizes performance and device availability in the event of a communication channel failure, and more particularly to a computer RAID disk interconnection topology for Fibre Channel connections to improve RAID array performance and data availability.

BACKGROUND OF THE INVENTION

Heretofore, Redundant Array of Independent Disk (RAID) topologies for computer and network applications have been based on the Small Computer System Interface (SCSI) bus architecture. This has limited the topologies to flat or two-dimensional topologies, that is conceptually "rows" of disks on "columns" of busses.

RAID is a technology used to improve the I/O performance and reliability of mass storage devices. Data is stored across multiple disks in order to provide immediate access to the data despite one or more disk failures. The RAID technology is typically associated with a taxonomy of techniques, where each technique is referred to by a RAID level. There are six basic RAID levels, each having its own benefits and disadvantages, with many other non-standard and proprietary variations. RAID level 2 uses non-standard disks and, though technically feasible, as such is not generally commercially feasible.

RAID level 0 (RAID0) employs "striping" where the data is broken into a number of stripes which are stored across the disks in the array. This technique provides higher performance in accessing the data but provides no redundancy which is needed to protect the data from disk failures. RAID level 1 (RAID1) employs "mirroring" where each unit of data is duplicated or "mirrored" onto another disk drive. Mirroring requires two or more disk drives. For read operations, this technique is advantageous since the read operations can be performed in parallel. A drawback with mirroring is that it achieves a storage efficiency of only 50%.

In RAID level 3 (RAID3), a data block is partitioned into stripes which are striped across a set of drives. A separate parity drive is used to store the parity bytes associated with the data block. The parity is used for data redundancy. Data can be regenerated when there is a single drive failure from the data on the remaining drives and the parity drive. This type of data management is advantageous since it requires less space than mirroring and only a single parity drive. In addition, the data is accessed in parallel from each drive which is beneficial for large file transfers. However, performance is poor for high I/O transaction applications since it requires access to each drive in the array. RAID level 3 is considered to have "shallow depth", and all disks are accessed substantially simultaneously.

In RAID level 4 (RAID4), an entire data block is written to a disk drive. Parity for each data block is stored on a single parity drive. Since each disk is accessed independently, this technique is beneficial for high I/O transaction applications. A drawback with this technique is the single parity disk which becomes a bottleneck since the single parity drive needs to be accessed for each write operation. This is especially burdensome when there are a number of small I/O operations scattered randomly across the disks in the array.

In RAID level 5 (RAID5), a data block is small so it generally fits onto a single disk. These data blocks are striped across the disk drives. Parity for the data blocks is distributed across the drives thereby reducing the bottleneck inherent to level 4 which stores the parity on a single disk drive. This technique offers fast throughput for small data files but performs poorly for large data files. RAID level 5 is considered to have "deep depth" and it is desirable that there be no I/O conflicts among the RAID5 drives.

A typical data storage system can contain a number of disk storage devices that can be arranged in accordance with one or more RAID levels, for example a data storage system may include RAID3 and RAID5 drive configurations.

In the past, RAID systems relied on SCSI bus architecture and single-port disk drives. The basic SCSI bus is a parallel communication channel, requiring multiple electrical connections or wires between SCSI connected devices, for example between the SCSI (disk) controller and the device (disk). So called "narrow" SCSI requires a 50-wire connection for 8-bit transfer in addition to power, ground, and a SCSI device identifier (ID). So called "wide" SCSI requires a 68-wire connection for 16-bit transfers in addition to power, ground, and a SCSI device identifier (ID). The 80-connector "SCA" interface is merely a single connector variation of the narrow or wide SCSI in which all data, power, and ID are combined into a single physical connector for ease in "hot swapping" the disk drive from a system with minimum effort.

Conventional SCSI may be characterized by the SCSI signals and signal connections, and the SCSI protocol level. While several varieties or levels of SCSI have conventionally been available, the "ultra-fast" SCSI has been the fastest supporting up to 40 MB/sec during data transfer in either single-ended or differential-signal versions. So called "low voltage differential" SCSI supports 80 MB/sec during data transfer operations. SCSI operations typically involve a data component and a command component, where the command component includes for example, commands, messages, and status.

Conventional RAID architecture has consisted of a computer communicating via an interface to a RAID controller. The RAID controller in turn communicated to a plurality of SCSI parallel busses, each bus supporting one or more disks connected by a single port to only one bus. If the bus to which the disk is connected should fail, the disk becomes unavailable independent of the operational state of the disk itself.

Even for dual-ported disk drives which could allow access to the disk via a second port, the doubling of the load on the channel, that is the increase from one disk to two disks or from 8 disks to 16 disk imposes several practical limitations. The parallel SCSI bus structure may typically not have sufficient bandwidth to support the added loading.

More recently, the Fiber Channel (FC) has become available. Fibre Channel is a serial communication channel requiring only four signal (data/control wires) to implement the Transmit (Tx) and Receive (Rc) functions, rather than the 50, 64, or 80 wired connectors as in the common parallel SCSI. The smaller number of physical connections required means that the back plane wiring to interconnect the channels in the manner required by some of the inventive structures is entirely practical, though the same connections may have been impractical for large number of devices on conventional SCSI parallel bus architectures. The Fiber Channel also provides a much higher speed and higher bandwidth interconnect medium than SCSI or other earlier computer bus or communication channels and is supported on either copper (that is electrical connections) or optical means such as fiber optical links and can support data transfer on the order of a 4 Gigabyte/sec or higher at the hardware level, with speed and capacity likely to increase with further development. Advantageously, Fibre Channel supports SCSI and TCP/IP protocols on the same serial bus. This removes the requirement to have separate circuitry to support TCP/IP protocol.

Fiber Channel structure and function are described in the literature and is therefore not described in detail here. Among the relevant reference texts are Fibre Channel—The Basics by Gary R. Stephens and Jan V. Dedek, published by ANCOT Corporation of Menlo Park, Calif. in 1997 (ISBN 0-9637439-3-7); and In-Depth Fiber Channel Arbitrated Loop by Robert W. Kembel, published in 1997 by Northwest Learning Associates for solution Technology of Boulder Creek, Calif. (particularly pages 1–21); each of which references are hereby incorporated by reference.

In spite of the advent of Fibre Channel, RAID disk topologies have remained substantially unchanged, typically retaining the flat or two-dimensional row-column configuration.

SUMMARY

This invention provides system, apparatus, and method for interconnecting computer devices to define an interconnect topology that maximizes performance and device availability in the event of a communication channel failure. The invention is particularly relevant and beneficial to a computer RAID disk interconnection topology for Fibre Channel connections to improve RAID array performance and data availability, but is not limited to such RAID systems. Other devices may be interconnected according to the structure and method of the invention. For example, a topology having multiple dual-ported controllers configured in a tube topology is provided for a switchable configuration having a plurality of channels (e.g. four channels) and an plurality of controllers (e.g. six controllers) arranged in a tube. In the event of a channel failure for this structure, the load will be evenly distributed to the remaining controllers. While the description here refers to disks, it will be clear to those workers having ordinary skill in the art in light of the description provided herein, that the invention is not limited and is applicable to any device controlled and interconnected in the manner described. For example, such devices include storage devices such as rotatable magnetic disks or discs, CDROM, DVD, optical disks, magneto-optical storage devices, solid state storage devices, and the like and systems relying on such storage technologies.

One particular embodiment of the invention provides a data storage system having: a plurality (n) of information storage devices each having first and second device access ports, a plurality (c) of communication channels, a device controller controlling access by the plurality of information storage devices to the plurality of communication channels, where at least one of the devices being connected via the first access port to a first one of the communication channels and via the second access port to a second one of the communication channels different from the first channel, so that the at least one device may be accessed by the controller via either the first channel through the first port or via the second channel through the second port; and wherein the relationship between the minimum number (n) of devices for an automatically balanced system and the number of channels (c) is defined by an equation of the form:

$$n = m \times k \times \sum_{i=1}^{c-1} i$$

where k and m are constants. System, apparatus, rules and procedures are defined for systems having more or fewer than the minimum number of devices.

BRIEF DESCRIPTION OF THE DRAWINGS

Objects and features of the invention will be more readily apparent from the following detailed description and appended claims when taken in conjunction with the drawings, in which:

FIG. 4 shows a channel protected topology model with failed channel.

FIG. 10 shows exemplary topologies having three, four, five, six, seven, and eight channels.

FIG. 13 shows a conventional parallel SCSI bus structure.

DETAILED DESCRIPTION OF SPECIFIC EMBODIMENTS

We now describe the invention in terms of several specific embodiments. While the invention is described relative to exemplary Fiber Channel communication channels, the invention is not so limited and is operable with and may be implemented in a HIPPIE Channel, a Fire Wire channel, SCSI, and any other channel having sufficient speed, bandwidth, and device number support to be useful. Each of these embodiments advantageously uses the Fiber Channel, disk drives that have a Fiber Channel interface with their environment (for example, the disk controller(s), the computer system, other disk drives if and where appropriate, and so forth), and disk drives that are dual-ported. The several embodiments described are examples of how the configuration can be enhanced through improved two-dimensional and new three-dimensional topologies to improve performance or data availability. The inventive tube topological structure and method provide for automatic and even disk access load redistribution in the event that a channel fails for any reason.

In the description and accompanying figures that follow, the disk drives are dual ported, with the active port shown in white (generally on left) and the inactive port shown in shaded or black (generally on the right). The controller ports are sometimes shown. While single controller topologies are illustrated, dual controller configurations may alternatively be implemented with no change in the topologies.

While the general principles of the standard RAID levels have been described (see Background of the Invention), certain inventive aspects may more readily be appreciated by recalling that RAID3 prefers shallow depths and RAID5 prefers deeper depths.

For purposes of the description to follow, and with only a slight loss of generality, it is assumed that the Fibre Channel drives are dual-ported, but that only one of the two ports is normally active, and that both ports can be used. The terms "disk", "disk drive", and "drive" are used interchangeably in this description and refer to any device to which is configured as a data or information storage or retrieval medium. The terms specifically include magnetic storage devices having rotatable platter(s) or disk(s), digital video disks (DVD), CD ROM devices, removable cartridge media whether magnetic, optical, magneto-optical, and the like. Furthermore, the terms "channel" and "loop" have synonymous meaning in this application, even though a loop may be considered to be a subset of a Fiber channel. Those workers having ordinary skill in the art will appreciate the subtle differences in the context of the description provided herein.

We now describe several RAID topologies, progressing toward the increasing complexity of a balanced redundant extensible model called the Tube Topology.

Flat Topology Model

Figure 1:
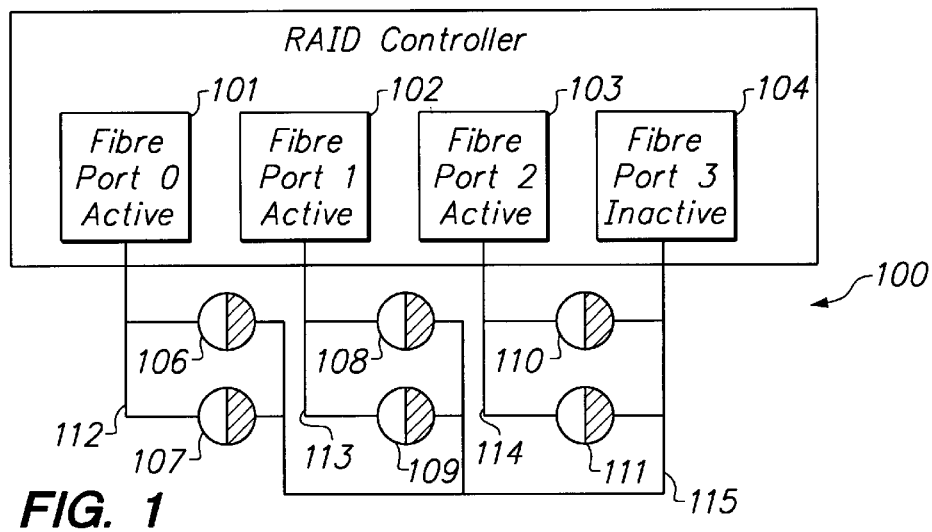
FIG. 1 shows a first exemplary embodiment of a RAID system having dual-ported disk drives.

A first embodiment is now described relative to the diagrammatic illustration in FIG. 1. This is the simplest model and is an extension of the traditional SCSI bus architecture. It includes three "active" controller Fiber ports 101, 102, 103 and one "inactive" fiber port 104. Each Fibre port is connected to the active port of two disk drives. Six disk drives (106, 107, 108, 109, 110, 111) are provided. For example, Fibre Port 0 is connected to first and second disks 106, 107; Fibre Port 1 is connected to third and fourth disks 108, 109; and Fibre Port 2 is connected to fifth and sixth disks 110, 111. Finally, Inactive Fibre Port 3 is connected to the normally inactive port of all of the dual-ported disks 106, 107, 108, 109, 110, 111.

In this topology, two loops are attached to each disk, one active loop (for example, loop 112 or 113 or 114), and one inactive loop (for example, loop 115). During normal operation, that is operation when the fiber channel is operating and has not failed, the drives spread across the three active loops. A 5+1 (5 data disks and 1 parity disk) or 4+1+1 (4 data disks, 1 parity disk, and 1 spare disk) RAID architecture can readily be envisioned operating with this topology. When one of the active loops fails, the disks are accessible from the inactive loop becoming active. While this topology has advantages over conventional topological structures, it is sub-optimal because it effectively wastes one of the channels (Channel 115), because except during channel 112, 113, or 114 failure, channel 115 is not used. As failure is a hopefully infrequent, or rare event, channel 115 will rarely if ever be used. Other topological structures described below make better use of the channel architectures.

Figure 2:
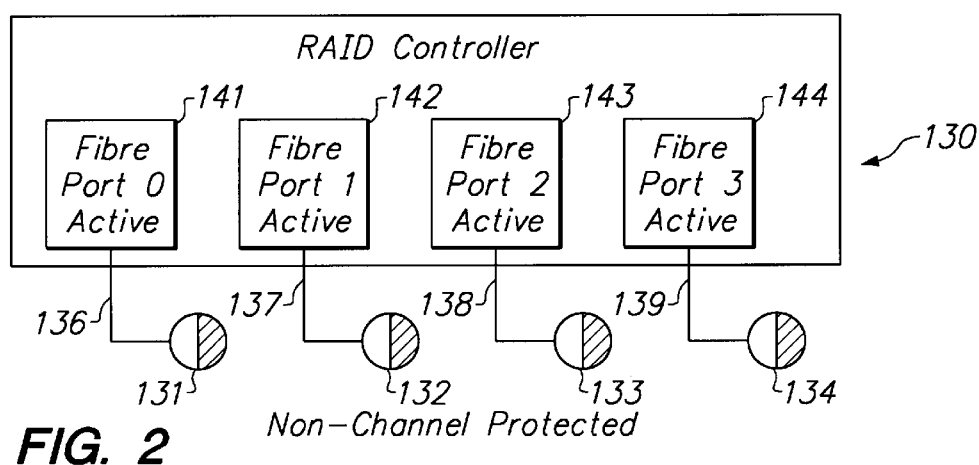
FIG. 2 shows a non-channel protected model, which includes four disks striped across different channels.
Figure 3:
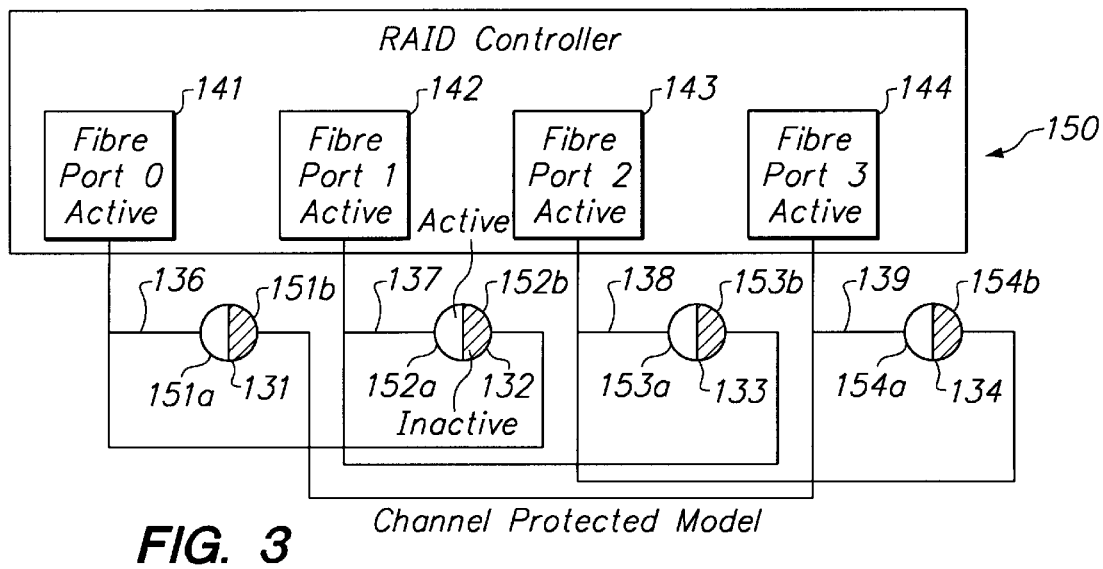
FIG. 3 shows a channel protected topology model.

A second embodiment of the inventive structure is now described relative to FIGS. 2 and 3. FIG. 2 shows a conventional structure 130 of a non-channel protected model, which includes four disks 131, 132, 133, 134 striped across different channels or busses 136, 137, 138, 139. This configuration might for example, represent a typical 3+1 RAID5 implementation which has one disk drive on each channel. It will readily be appreciated that if one of the channels 136, 137, 138, or 139 in the topology 130 of FIG. 2 fails, it is the same as a disk failure. The data can be recovered using the traditional RAID algorithm. No spare channel or channel redundancy is available.

The conventional topology of FIG. 2 can be changed to protect against a channel failure. This is accomplished by using one or more of the channels 136, 137, 138, 139 as a backup channel. A Channel Protected Topology Model 150 is illustrated in FIG. 3. With a 4 channel controller, each channel can wrap to an inactive port of a drive 131, 132, 133, 134 on a different channel. In the diagram below the shaded (black) ports 151b, 152b, 153b, 154b on the disk drives are inactive during normal operation. However, if one of the channels fails the disk can be accessed via the second port 151b, 152b, 153b, 154b which is on a different channel. The channel wrapping for example connects Fibre port 0 (141) from the active port 151a of disk 131 to the normally inactive port 152b of disk 132. And, for example if Port 1 failed, the topology would look as illustrated in the channel protected model with failed channel illustrated in FIG. 4. Here, normally active port 152a has become the inactive port as a result of port 1 failure, and normally inactive port 152b has become active. The disk normally accessed on Port 1 is now accessed through Port 0, albeit with some, though potentially unrealized performance degradation as explained further below.

The performance for the non-degraded mode of FIG. 3 is almost the same as the conventional topology model of FIG. 2. However, in the channel degraded mode of FIG. 4, the performance is much better than with a disk failure because no data reconstruction needs to take place. The disk is still accessible via its second port and the alternate communication channel. There will be a slight degradation in performance if the two disks that are now on the same channel are contending for the channel.

This advantage is possible with the Fibre Channel for several reasons. First, dual ported parallel SCSI disk drives are usually not typically used in RAID systems. Therefore, when a parallel SCSI bus fails, all of the drives on that bus become inaccessible. Second, the maximum rate for Ultra-SCSI is 40 Mbytes/sec and is 80 Mbytes/sec for low-voltage differential (LVD) parallel SCSI. The rate for Fibre Channel is 100 Mbytes/sec with specification for 400 Mbytes/sec. Parallel SCSI will support 16 devices (e.g. disk drives) with IDs 0–15, while Fibre will support 127 devices per channel.

Figure 5:
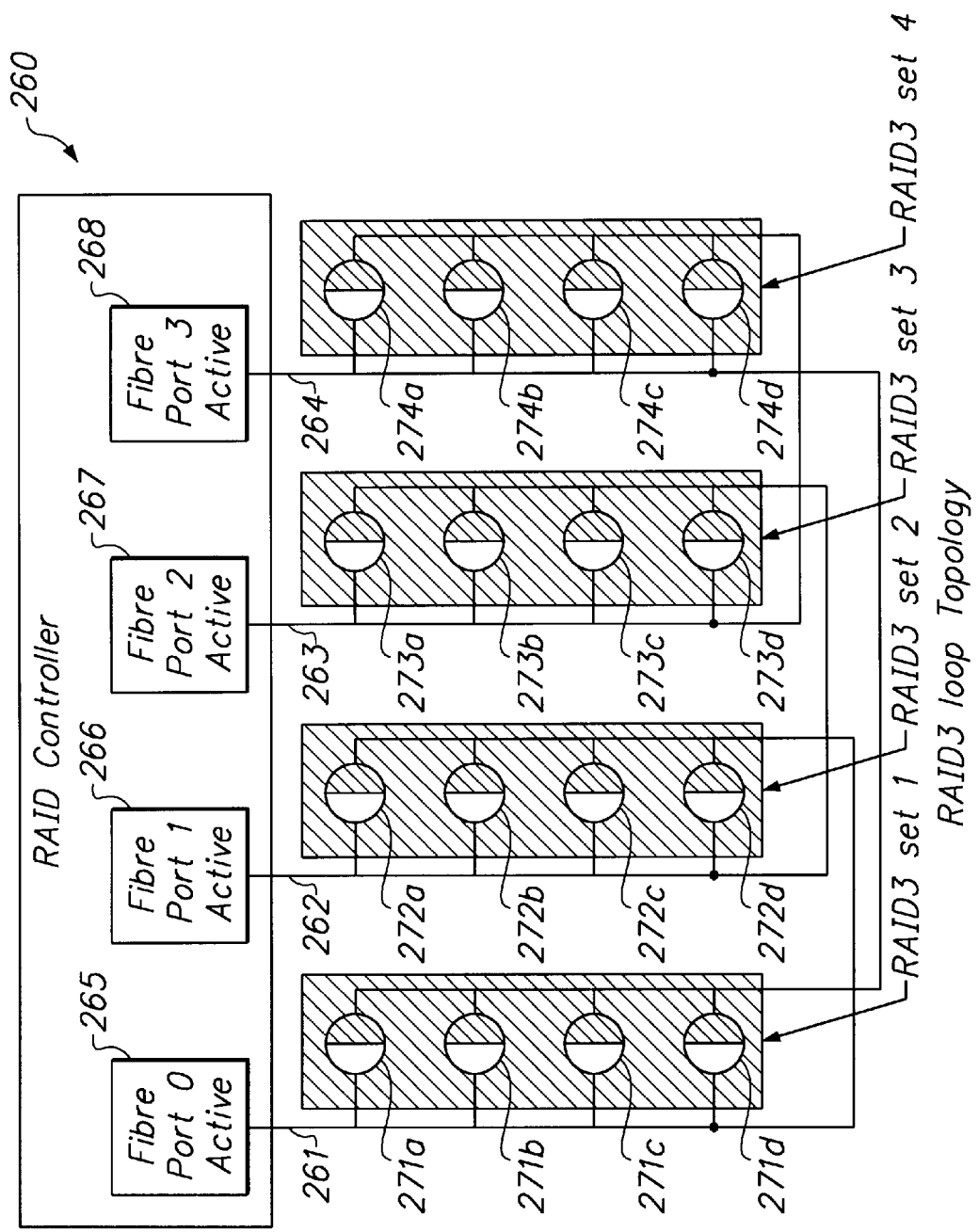
FIG. 5 shows a multiple-RAID3 Channel topology.

We now consider a multiple-RAID3 Loop topology of FIG. 5. For the moment we delay consideration of loop redundancy. The reason will become apparent further in the discussion.

The RAID3 loop topology 260 of FIG. 5 includes four Fiber Channels 261, 262, 263, 264 coupled respectively to four RAID controller Fibre ports 265, 266, 267, 268. Each of these channels is connected to an active port of a first set of RAID3 disks 271 (271a–271d), a second set of RAID3 disks 272 (272a–272d), a third set of RAID3 disks 273 (273a–273d), and a fourth set of RAID3 disks 274 (274a–274d) respectively. A RAID3 set is a plurality of disk drives configured such that large amounts of data can be written in parallel to all the disks without requiring the parity to be modified but overwritten instead. However, each of the fiber channels is also connected to the normally inactive disk drive port of a different set of RAID3 disk drives in wrap-around fashion. Here, Fibre channel 261 is also connected to RAID3 set 2, Fibre channel 262 is also connected to RAID3 set 3, Fibre channel 263 is also connected to RAID3 set 4, and Fibre channel 264 is also connected to RAID3 set 1. While the particular connectivity may vary, so that other connection patterns may be implemented, it should be understood that each RAID3 disk set should have the normally active set of disk ports connected to one Fibre channel and the normally inactive port to a different Fibre channel. The FIG. 5 configuration is referred to as a RAID3 configuration because of the shallow depth of the RAID set and how the data is spread across the drives.

In RAID3 transactions, the depth of the stripe is typically set to a shallow value (for example, 1 kbyte or 2 blocks) so that data can be easily spread across all the drives. When this happens there is no Read/Modify/Write penalty because the parity data is recalculated for each row. The data throughput for a Fiber channel is very close to 100 Mbyte/sec, less the overhead of the SCSI command. The data throughput for a Fibre disk is between about 14.5 Mbytes/sec and about 21 Mbytes/sec internal rate depending on the location of the data on the disk platter. This is for a disk drive having a spindle speed of 10,000 RPM. The external burst rate is 100 Mbytes/sec, but it cannot be sustained because of the transfer of data onto and off of the disk drive media. Therefore the data can be streamed onto the Fibre channel and siloed. In other words, it is stored temporarily in the disk drive's cache until it is written onto the media. For example, 2 kbytes of data is transferred to the first disk at 100 Mbytes/sec, then 2 kbytes are transferred to the second, third, and fourth disk in like manner. While data is being transferred to the other three disks, the first disk is emptying its cache onto the media at the slower internal speed. When the controller is ready to write data to the first disk, it is ready to receive the data. This keeps the disks busy and keeps the fibre channel full of data The silos take data from the controller at 100 Mbytes/sec, but dispense the data to the media at 14–20 Mbytes/sec. The same is true when reading data from the media and sending it to the controller. By using the flat model for RAID3 as illustrated in FIG. 5, multiple RAID3 arrays could be put onto a multi-channel Fibre controller and the activity on one RAID3 array should not interfere with the operation on the others.

A RAID5 implementation benefits from alternative design criteria. That criteria being different from the RAID3 criteria. While for RAID3, the depth is usually set shallow, in RAID5, the case is quite different. For RAID5, the depth is usually set deep so the disks are accessed independent of each other. A Read/Modify/Write penalty exists for write operations in RAID5. For this reason, one typically prefers the disks to be on separate Fibre channels. A RAID5 channel topology is illustrated in FIG. 6.

Figure 6:
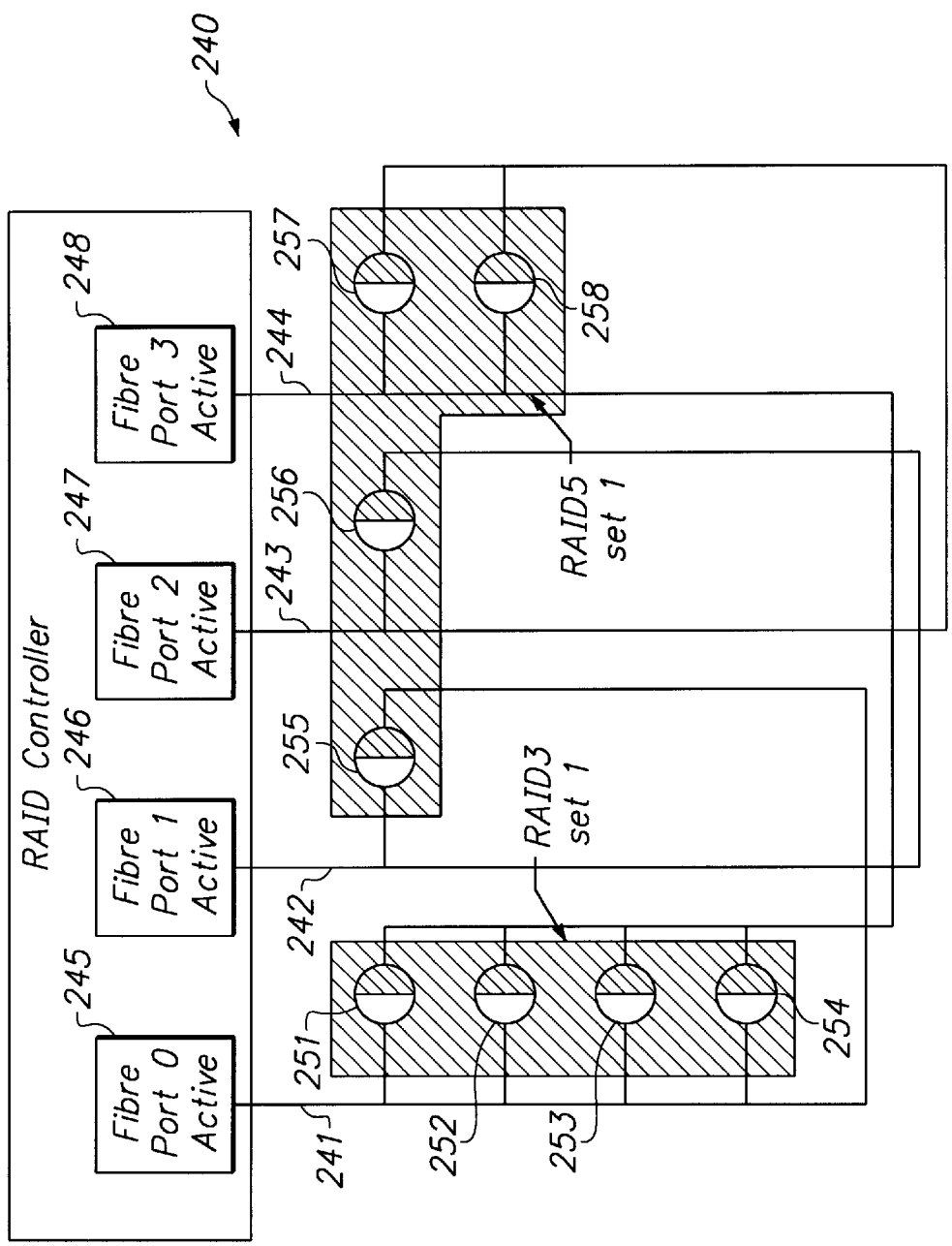
FIG. 6 shows a multiple-RAID5 channel topology.

The RAID5 loop topology 280 of FIG. 6 includes four Fiber Channels 281, 282, 283, 284 coupled respectively to four controller Fibre ports 285, 286, 287, 288. Each of these channels is connected to an active port of a first set of RAID5 disks 291 (291*a*–291*d*), a second set of RAID5 disks 292 (292*a*–292*d*), a third set of RAID5 disks 293 (293*a*–293*d*), and a fourth set of RAID5 disks 294 (294*a*–294*d*) respectively. Notice that while the RAID3 Loop topology of FIG. 5 configured a RAID3 set of disks on the same active channel, the RAID5 loop topology of FIG. 6 connects each of the disks in a RAID5 set on a different channel.

A RAID5 set is a plurality of disk drives configured such that small amounts of data can be written to or read from one disk in parallel with other pieces of data being written to or read from other disks. The sacrifice for the parallel access is that parity must normally be modified with each write. Analogous to the RAID3 loop topology, the RAID5 loop topology also provides a connection of each of the fiber channels to a normally inactive disk drive port of a different RAID5 disk drive in wrap-around fashion, however, in a RAID5 configuration a common Fibre channel connects across a plurality of disk drives associated with different RAID5 sets. For example, in the FIG. 6 embodiment, Fibre channel 281 is also connected to the normally inactive port of a disk drive from each of RAID5 set 1 (291*b*), RAID5 set 2 (292*b*), RAID5 set 3 (293*b*), and RAID5 set 4 (294*b*). Similarly, each of Fibre channels 282, 283, and 284 are connected to the normally inactive ports of RAID5 disk drives. While in general, the particular connectivity may vary, so that other connection patterns may be implemented, it should be understood that each disk in a RAID5 disk set should have its normally active port connected to different Fibre channels and the normally inactive port to Fibre channels different from the active port. The FIG. 6 configuration is referred to as a RAID5 configuration because of the deep depth of the RAID set and how the data is distributed among the drives.

Figure 7:
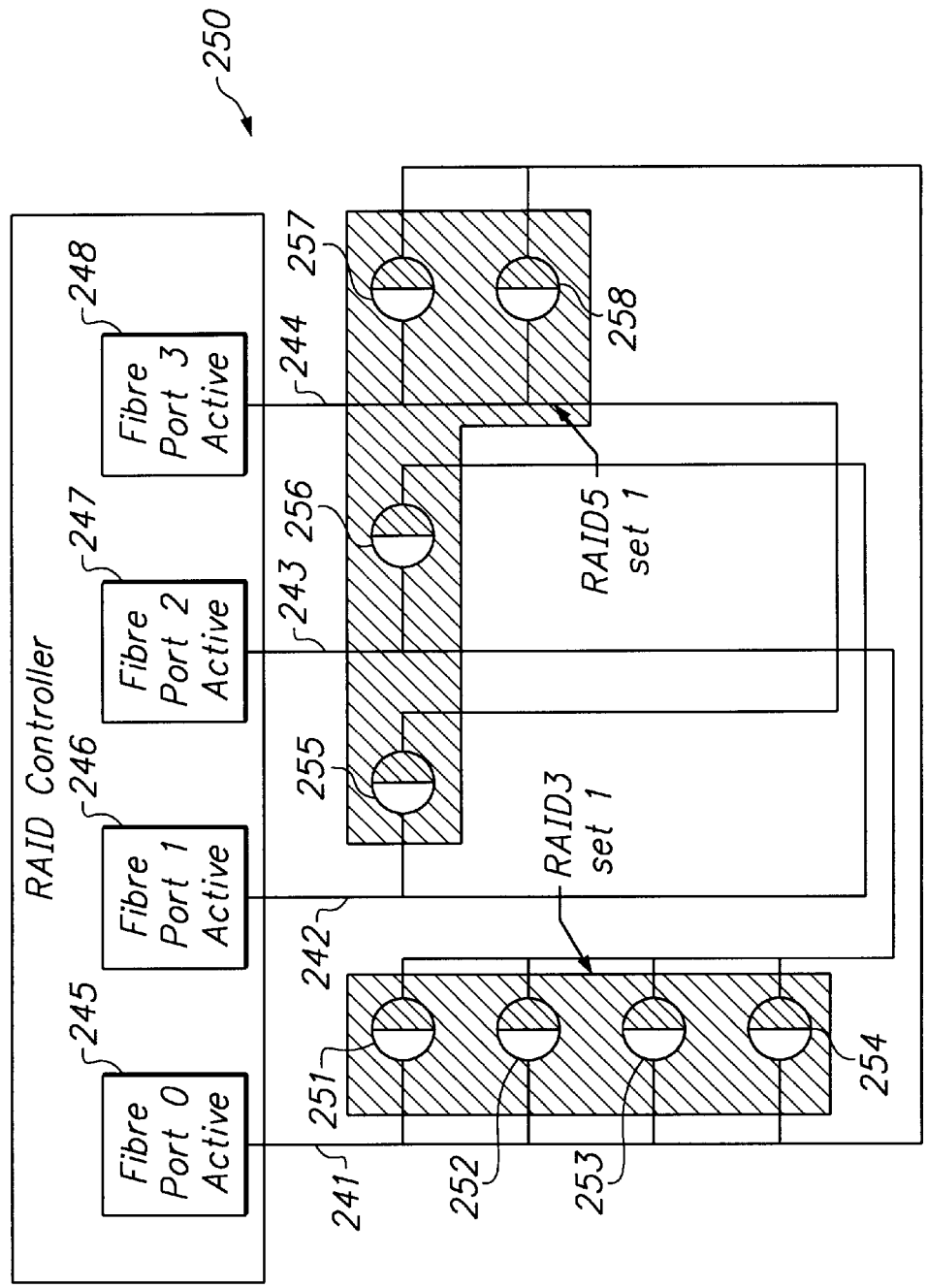
FIG. 7 shows two alternative combined RAID3/RAID5 topologies.

If a design is needed for both RAID3 and RAID5 arrays, the topologies can be merged with the Fibre loop for one RAID array being the back-up for the other RAID array. One such exemplary combined topology 240 is shown in FIG. 7*a*. The shaded (black) port is still inactive in the normal operational case. In this exemplary embodiment, RAID3 set 1 of disks 251, 252, 253, 254 is served at each active disk drive port by fiber channel 241 and each of the drives are on the same controller channel 241. Each normally inactive port of RAID3 set 1 is served as a back-up by Fibre channel 244 which is the primary channel serving disks 257 and 258 of RAID5 set 1. Additional RAID3 or RAID5 sets can be added to this topology.

An alternative combined RAID3 and RAID5 loop topology 250 is illustrated in FIG. 7*b*. Here, the topology of the primary normally active disk drive ports, disk drives, Fibre channels is the same as in FIG. 7*a*; however, the topology of the back-up or secondary Channel has been changed such that for example, disk drives 257, 258 are served by channel 241 rather than by channel 243 as in FIG. 7*a*. This change may provide more even channel loading in the event of channel 244 failure since the two RAID5 disks 257, 258 would then be served by the RAID3 primary channel 241 rather than by another RAID5 channel 243 as in the topology of FIG. 7*a*. Other variations are possible, and each may have its particular advantages and/or disadvantages relative to database and/or server requirements. Additional RAID3 or RAID5 sets can be added to either of these topologies.

The performance of this combined RAID3 and RAID5 topology in FIGS. 7*a* and 7*b* is the same as that of the independent RAID3 and RAID5 topologies. Moreover, if one of the loops fails, the disks are accessible from the other loop attached to the drive. However, even with the advantages of these topologies, when a channel fails, the channel load is not distributed evenly to the remaining channels.

It is noted that the conventional topology for both RAID3 and RAID5 is to distribute the disk drives across different (SCSI) busses. The inventive structure permits distribution of RAID3 disks on a single bus or channel. This change from conventional implementations is made possible because of the Fibre bandwidth (about 5 times the sustained throughput of a disk drive), and because with dual ported drives, there is a redundant path to the disk in the event of a Fibre channel failure. The ability to distribute RAID3 disks on a single channel is not required by the inventive structure or method but may have advantages in some instances. This appears to be the case in some instances since it appears that systems configured in this manner may operate in a more nearly optimum manner owing to the fact that RAID5 operates a deep depth so that it is desirable that disk drive input/output (I/O) not conflict, whereas for RAID3 configurations, the depth is shallow and all of the disks in a RAID3 set are accessed substantially simultaneously.

For example, a RAID3 configuration is advantageous for a geographical map database that typically services a small number of large data transactions, while a RAID5 configuration would typically be employed for a hotel reservation system for which one would predict a large number of transactions of small amounts of data. This principle is also supported by the differences in the "burst" and "sustained" data rates of known channels, including Fibre channel, the rotational latency of rotating storage devices, and the probable need to buffer data as a result of differences in data rates sustainable in the different parts of the RAID system. Typically, the disk are the slowest with sustained rates in the 15–20 Mbyte/sec range, and in the case of Fibre channels, the sustained rates approach 100 Mbytes/sec with a specification to 400 Mbytes/sec (MB/sec).

By observing this principle in a configuration having multiple channels, and placing all of a particular related set of RAID3 devices on a single channel, only one channel is tied up during the RAID3 transaction, rather than all channels. On the other hand, by spreading members of a set of RAID5 devices among all the channels, simultaneous access to the disks is achieved and this can be used to support multiple processes on a host computer concurrently accessing data in different locations of the file system. For parallel SCSI configurations this may not always be possible due to bandwidth limitations, but is fully supportable for dual-port/ dual-access devices on channels having sufficient bandwidth, such as Fibre channel.

Tube Topology Model

We now describe a further embodiment of the inventive topological structure that provides 3-dimensional model and advantageously provides automatic channel load leveling in the event of a channel failure. Moreover, the combination of Fibre channels, Fibre channel controllers, and dual-or multi-port disk drives provide some special advantages over the inventive embodiments already described as well as over conventional structures.

First, we necessarily digress to briefly describe some background of fiber channels as a precursor to the discussion to follow. At least three basic fiber channel topologies are known: (1) so called "point-to-point", (2) arbitrated loop, and (3) Fibre channel fabric. The "point-to-point" topology connects each of two devices (such as a computer and a disk drive) by simple links (such as four wires or fibers, or two pairs), a transmit (Tx) pair at a terminal on DEVICE1 connected by the first link to the receive (Rc) terminal on DEVICE2, and a transmit (Tx) pair on a terminal on DEVICE2 connected by the second link to the receive (Rc) terminal on DEVICE1. The point-to-point topology is not readily applied to RAID arrays because only a single disk drive can be attached.

The next level of topological complexity is the "arbitrated loop". Conventional arbitrated loop topologies can support up to 127 devices on each loop, and a loop can link a combination of devices such as for example a computer and a multiplicity of disk drives. (Recall that SCSI buses are limited to 15 devices on each bus.) Practically speaking, it may be desirable to limit the number of devices on a Fibre channel arbitrated loop to fewer than the permitted 127 devices to maintain performance to desired levels, and to limit the number of disks that are affected in the event of a Fibre channel failure. Logical Unit Number (LUN) concepts also apply to such arbitrated loops, and arbitration may be "fair" or "unfair" as known in the art. Of course a system my include multiple arbitrated Fibre channel loops.

The next higher level of Fibre channel topology is the so called "fabric", which comprises a plurality of connected arbitrated loops. There are 224 unique addresses within the world wide address space so that it is theoretically possible to connect virtually everything via a single public fabric. However, this fabric topology is not generally applicable to RAID systems, largely because this high level of interconnection is not required and may in fact be undesirable. In addition, by placing the disk side of a RAID system on a public fabric, the disks could be accessible to access by entities other than the controller of the RAID array.

Figure 8:
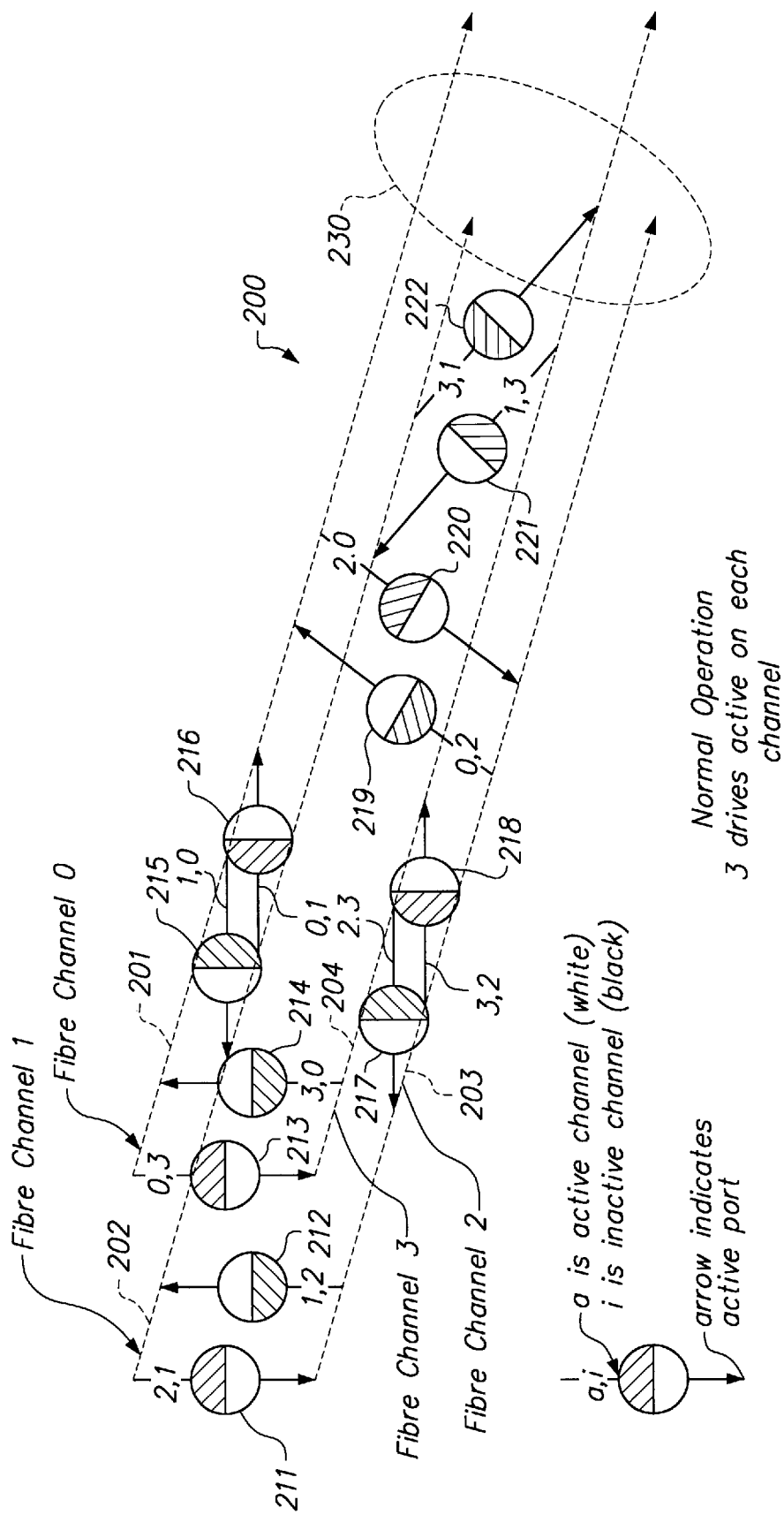
FIG. 8 shows a three-dimensional topology supporting four Fibre channels and twelve disk drives in normal operating mode.

Each of the afore described topological or architectural structures are variants of a flat or two-dimensional topology. In the diagram of FIG. 8 a three-dimensional topology 200 is illustrated supporting four Fibre channels 201, 202, 203, 204, and twelve disk drives 211–222, three drives active on each of the four channels. In this figure, each ball represents a disk with one active port (white) and one inactive port (shaded). The four Fibre channels, Fibre channel 0, Fibre channel 1, Fibre channel 2, and Fibre channel 3 are arranged logically to form an extruded square tube structure 230. Each disk can then be placed or connected relative to tube 230 so as to attach to any two Fibre channels.

In the FIG. 8 embodiment, the first 4 disks 211, 212, 213, 214 (appear vertical) are connected from Fibre channel 0 to 3 (notationally 0,3 or 3,0) and from 1 to 2 (notationally 2,1 or 1,2). The second four disks 215, 216, 217, 218 (appear horizontal) are connected from channel 0 to 1 (0,1 or 1,0) and 2 to 3 (2,3 or 3,2). The third set of disks 219, 220, 221, 222 (appear on the diagonals) are connected from Fibre channels 0 to 2 (0,2 or 2,0) and 1 to 3 (1,3 or 3,1). Note that the first numbered channel is the inactive port designation, and the second number is the active port designation.

Figure 9:
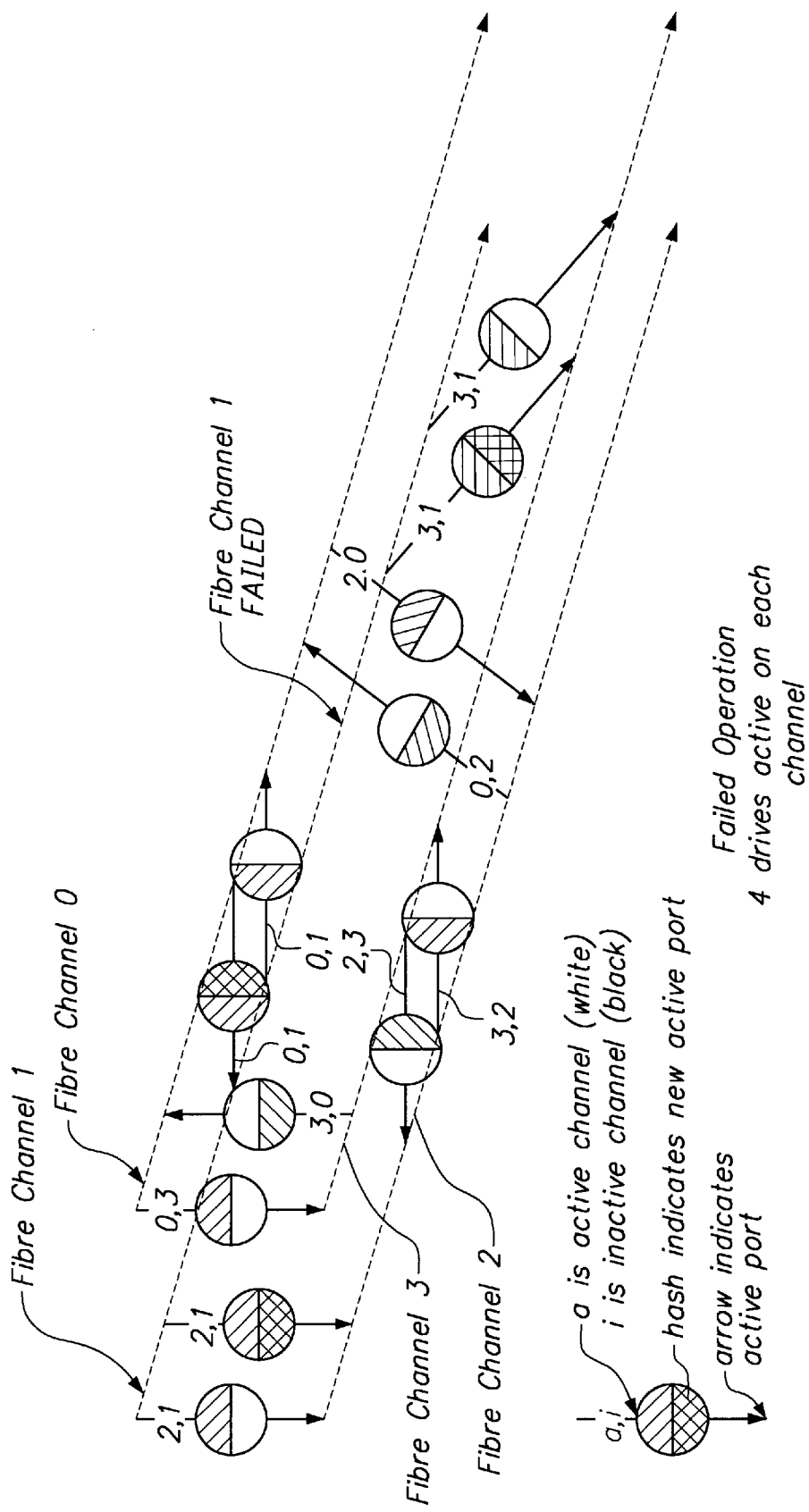
FIG. 9 shows a three-dimensional topology in FIG. 8 with one failed channel.

With this topology and this example, each channel has three active disks. In the case of a single channel failure which reduces the available channels from four to three, the load for the twelve disks is evenly distributed to the remaining three channels. For example, in FIG. 9, there is shown the resulting operation when one of the channels, Fibre channel 1 (202), has failed. By inspection we see that after the single channel failure, there are four drives active on each of the remaining three channels. Here, channel 1 has failed and the disk's IO has been evenly distributed to the remaining channels.

Using the ideas from the previous layouts, RAID3 and RAID5 arrays can be build by selecting the appropriate disks. Moreover, because this topology is balanced for each twelve (12) disks, it can be extended to 24 disks, 36 disks, or like multiples of 12 disks and still maintain the balance. When fully dual-ported disk drives are provided, that is disk drives in which concurrent independent commands are processed, the topology is still balanced and also allows access to a disk through the less busy channel.

Having described an exemplary four channel, twelve (12) disk topology to facilitate understanding of the underling principle, we now present and explain a more generalized relationship between the number of disk drives and the number of channels so as to provide redundancy, device access, and load balancing in the event of channel failure. A more generalized formula for the number of disk drives to build an automatically balanced tube set is:

$$\text{Number of Drives} = 2 \times \sum_{i=1}^{\text{channels}-1} i \qquad (EQ.1)$$

Equation 1 (EQ. 1) defines the relationship between the number of minimum drives for a balanced system and assumes that the drives have one active port each. The number can be multiplied by an integer for greater capacity. For example, with four (4) channels, the number of drives is twelve (12), but twenty-four (24) drives, or thirty-six (36) drives, or other multiple of twelve drives will also work.

When disk drives that are fully dual ported are configured in the inventive system, the '2' in Equation 1 is no longer needed and the relationship simplifies to that defined by Equation 2 (EQ. 2).

$$\text{Number of Fully Ported Drives} = \sum_{i=1}^{\text{channels}-1} i \qquad (EQ.2)$$

For this case the number of drives for a 4 channel topology is six (6) drives not twelve (12) drives as earlier described, and the integer multiples become 6 drives, 12 drives, 18 drives, and so forth.

The number of disk drives and channels may be selected in accordance with the afore described relationships in EQ. 1 and EQ. 2. Examples of the topological structures available are illustrated in the diagrams of FIGS. 10a–10f which show the views of connections for tubes of different sizes. The vertices of FIGS. 10a–10f represent the channels of the "extruded tube" extending conceptually outward from the plane of the drawing, and the lines between vertices represent the connectivity of the dual-ported disk drives, one port extending to each of two fiber channels.

Advantageously, the Fibre channel controllers, dual ported Fibre disk drives, and the inventive topologies described herein will allow more robust and varied designs of RAID to be implemented. This implementation can be done in the cabling among the disks, or in the layout of the channels in a back-plane or mid-plane. By using an embodiment of the inventive tube topology, automatic load balancing can be achieved in the event of a Fibre channel failure. Moreover, the tube topology will work as well for one controller as two- or multiple-controller designs.

FIG. 10 illustrates exemplary topologies having three, four, five, six, seven, eight, nine, ten, or more channels. The extension to these numbers of channels and disk drives follows directly from the embodiments already described and the mathematical relationships provided by EQ. 1 and EQ. 2.

Figures 11A, 11B:
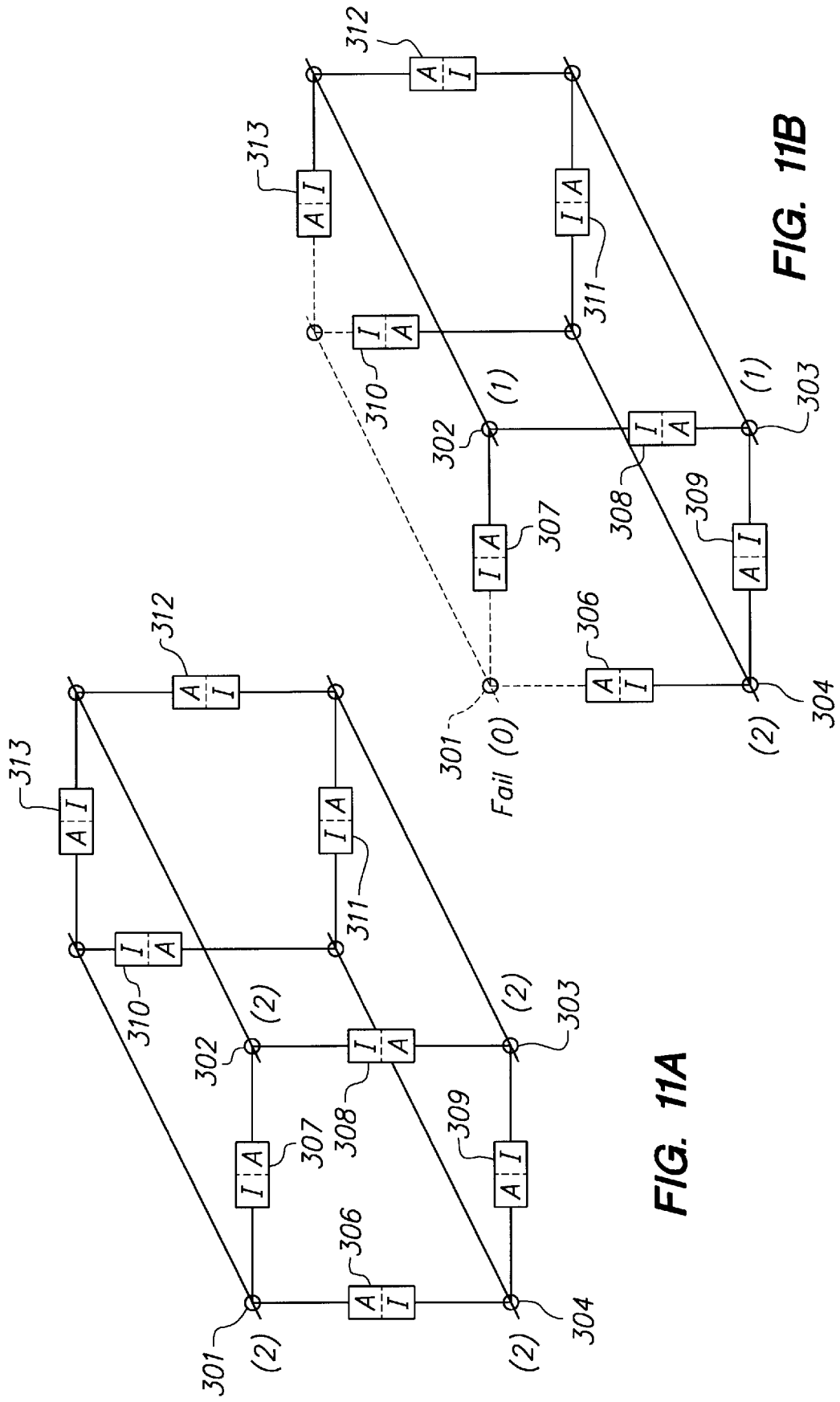
FIG. 11 shows a portion of an exemplary four-channel eight-disk unbalanced system in which each disk has active and inactive ports.

The manner in which automatic channel loading is achieved is now described for several exemplary embodiments of the tube topology. With respect to FIG. 11, there is illustrated a portion of a four-channel eight-disk system in which each disk has active ("A") and inactive ("I") ports. During normal operation as in FIG. 11a, the four channels 301, 302, 303, 304 each serve one active port for disk drives 306, 307, 308, and 309 respectively; and serve as the back-up channel at the inactive port of 307, 308, 309, and 306 respectively. Each channel also supports disk drives 310, 311, 312, and 313 in similar manner. Each channel has the load of two disk drives. However, in the event that one channel fails as shown in FIG. 11b, for example channel 301, communication to the active port of disk 306 and with the active port of disk 313 is not possible. Rather, the loading on channel 304 doubles to "4" as a result of the added burden to service disk 306 through its normally inactive port, and disk 307 no longer has back-up channel service; and the loading of channel 302 similarly doubles as a result of the need to serve disk 313. The active port loading for each channel is indicated in parenthesis adjacent each channel node 301, 302, 303, 304. The loading is imbalanced after failure, and the imbalance is even greater if one also considers the additional load imbalance that would occur from serving the inactive ports.

Figure 12A:
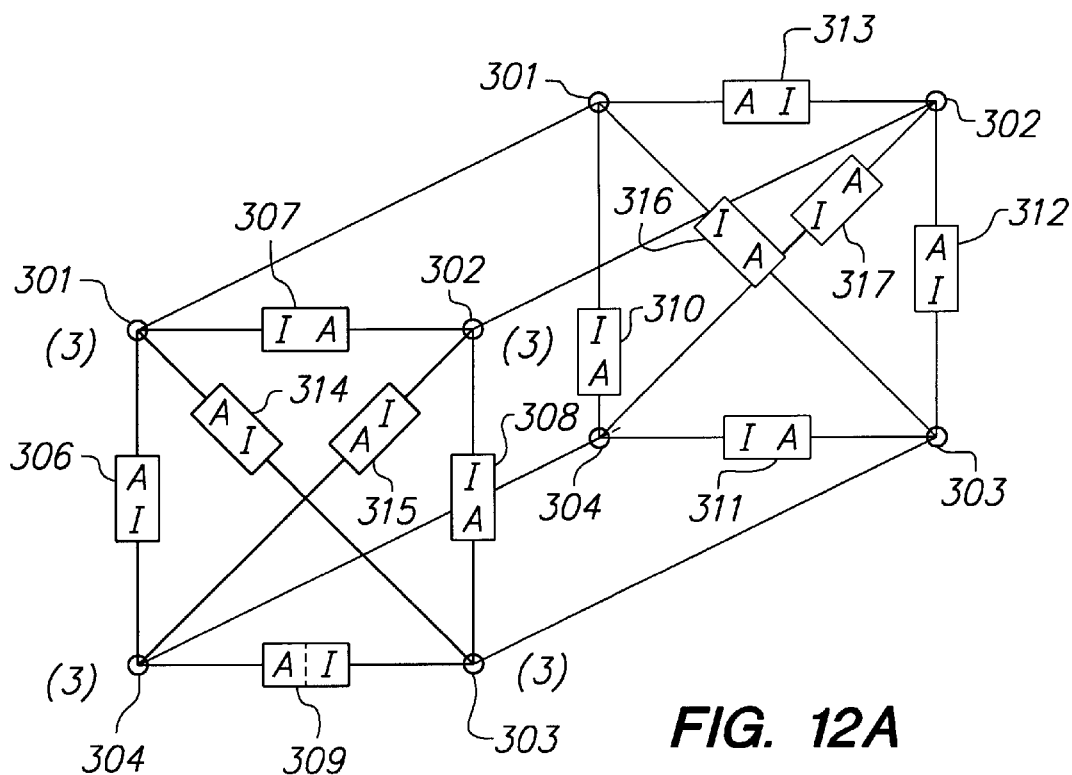
FIG. 12 shows a portion of an exemplary four-channel twelve-disk balanced system in which each disk has active and inactive ports.
Figure 12B:
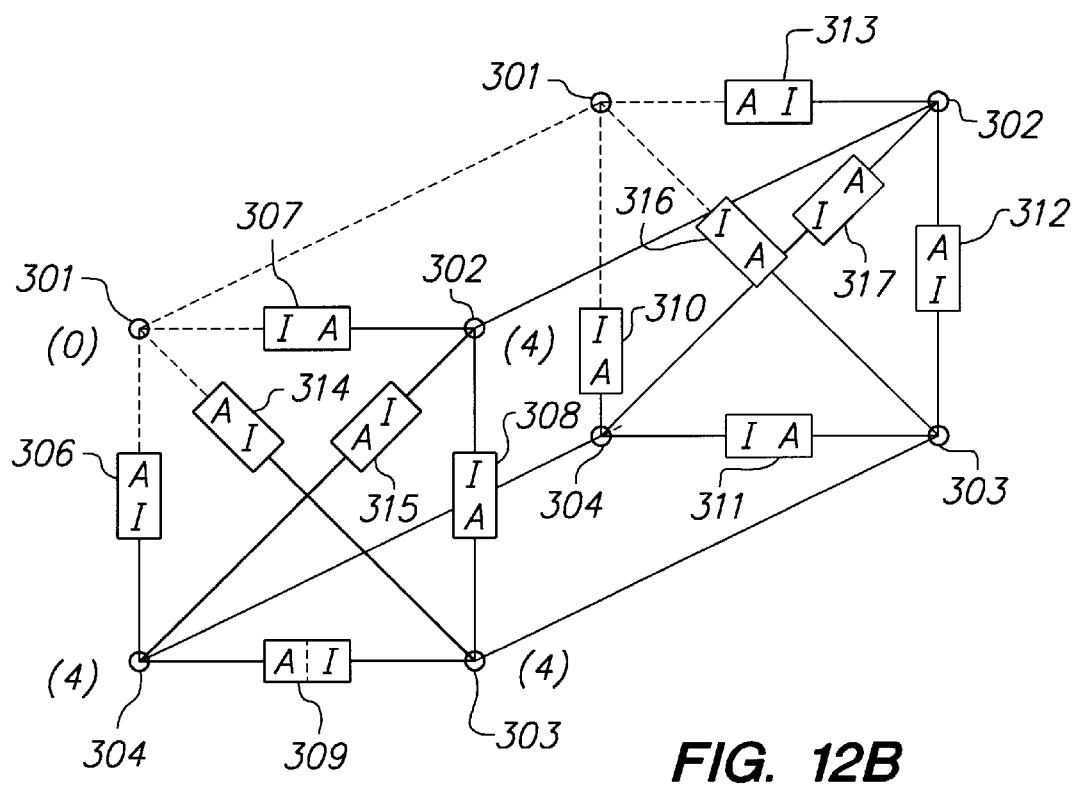

On the other hand, the imbalance may be alleviated by the topological interconnect structure illustrated in FIG. 12 which shows the same four channels, but with twelve disk drives connected to the immediately adjacent channels and between diagonally opposed channels. (These references refer to the topology illustrated in the drawing and are not intended to impose a physical geometry on the physical layout of actual hardware elements.) With respect to the topology in FIG. 12a, during normal operation each of the four channels sees a 3 disk load. In the event of a channel failure, for example channel 301, the effective load to the failed channel drops to zero, and the load to each of the remaining operation channels 302, 303, 304 increases from three (3) disks to four (4) disks in balanced manner, that is, each of the remaining operable channels load increases from three (3) disks to four (4) disks.

Revisiting EQ. 1 in light of the topology in FIG. 12, we can confirm that the minimum number of drives to obtain automatic load balancing is:

$$\text{Number of Drives} = n = 2 \times \sum_{i=1}^{\text{channels}-1} i = 2 \times (1 + 2 + 3) = 12$$

where the number of channels is equal to 4.

On the other hand for fully functional duplex drives where the drives can simultaneously handle I/O through both ports (disks with two "active ports"), EQ. 2 applies and the number of disk drives is reduced by one-half. In effect, the distinction between EQ. 1 and EQ. 2 is somewhat artificial. In reality each of the equations pertains to the number of independent disk drive ports served by the fiber channels. In essence, six disk drives having two fully functional ports is the same as twelve drives each having a single port. In the case of a drive having one active and one inactive port, when one port accessible the other port is not, and vice versa For drives having active-active ports, both ports can be accessed at the same time.

Having described a number of exemplary four channel topologies, we note that the invention is not limited to four channel systems, but that the concepts, structures, and operational principles apply to any system having three or more channels. The two-channel implementation is somewhat degenerate in that the failure situation has all the disks on the remaining one channel and there is no load to balance.

An additional optional feature of the invention provides for dynamic load shifting to an alternate path. This would permit load leveling when hot-spots of increased activity occur.

In FIG. 13, there is illustrated a conventional parallel SCSI bus structure 405, 406 between first controller 401, and second controller 402. Each controller 401, 402 has an associated cache 403, 404. Disk drives 408 are arrayed on the SCSI buses 405, 406. The controllers interface to the host computer 410 via an interface 412.

Figure 14:
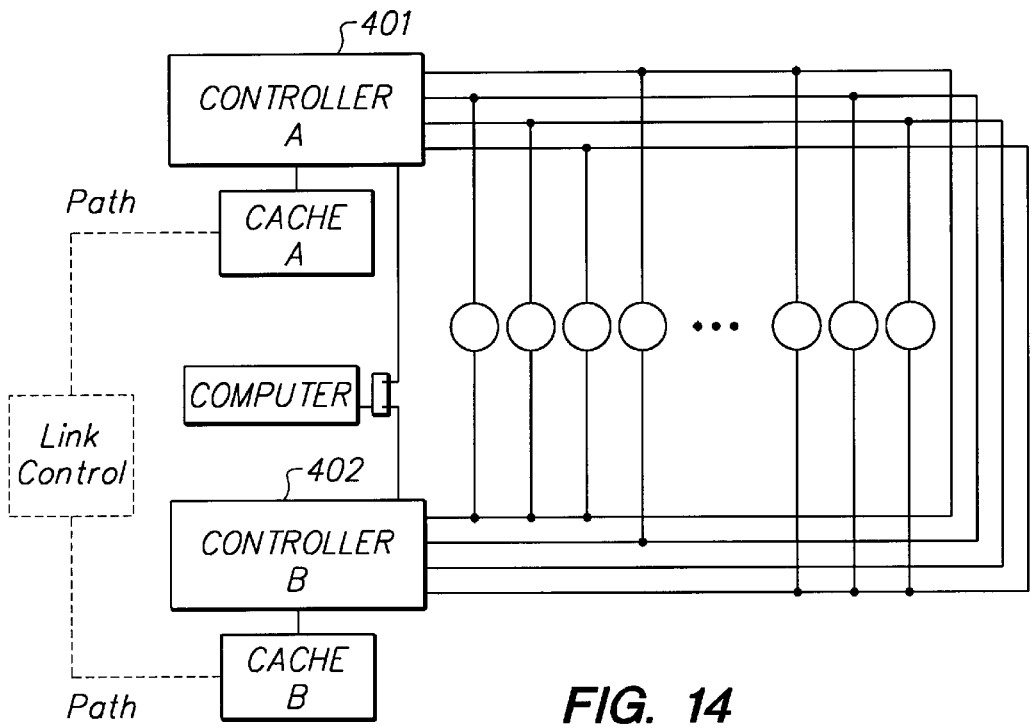
FIG. 14 shows an exemplary topology that combines dual-ported disks with Fibre channel loops and dual controllers, and an optional path between the caches associated with each controller.

A further alternative embodiment of the invention provides multiple controllers that can access all of the disk drives, rather than a single controller. This is an improvement over the conventional structure in FIG. 13. In this FIG. 14 embodiment, if one controller fails, the other controller can step in to permit continued access to the disks in the RAID array. In FIG. 14, there is shown a topology that combines dual-ported disks with Fibre channel loops and dual controllers, and an optional path between the caches associated with each controller. In this topology, the same Eq. 1 or Eq. 2 applies to determine the minimum number of disk drives to achieve balanced operation.

Throughout this description, the minimal number of drives or a multiple of that number has been used. It should be understood that the invention is not limited to use of any particular number of drives. Therefore, we address two additional cases. For each of these cases, we assume that the disks have single active ports.

The first case, is that in which the number of disks is less than the "minimum". As Equation 1 specifies the minimum number of drives for a 4-channel configuration is 12 disks, the disks should advantageously be added so that the number of ports on each channel is as close to being balanced as possible. For example, Table I provides a list of one exemplary manner for which disk drives are added to the system and to specific channels of the system to improve or maintain balance or pseudo-balance as the drives are added. The list is only partial showing a number of disks from 3 to 7, but it illustrates the procedure. It is not the only implementation.

TABLE I

Case I - Exemplary Procedure and Resulting Structures for Increasing Number of Disks to be less than minimum number.

| Number of Disk Drives | Connections on controller port 0 | Connections on controller port 1 | Connections on controller port 2 | Connections on controller port 3 |
|---|---|---|---|---|
| 3 | 1 | 1 | 1 | 0 |
| 4 | 1 | 1 | 1 | 1 |
| 5 | 2 | 1 | 1 | 1 |
| 6 | 2 | 2 | 1 | 1 |
| 7 | 2 | 2 | 2 | 1 |

In the event of a failure, the number of connections on the failed controller port will migrate to the other ports. If the location of the disks is chosen properly, the controller ports will usually migrate to a balance with a difference of 1, but there are cases where this may not always happen. In fact, it is dependent on the particular Fibre channel that fails. The performance impact of a failed Channel in a seven drive case may be a redistribution of 2, 2, and 3 active ports for the remaining channels, or may be 3, 3, and 1. Because the channels will not saturate with 3 active ports, either of these scenarios will have minimum impact.

The second case, is where the number of disk drives is greater than the minimum number but not an integer multiple. For example, if a 4-channel system had 13, 14, 15, or 23 disk drives, this number would be more than one times the minimum for a 4-channel topology, but less than two times the minimum. Again a partial and exemplary list of one possible way of configuring the disks is provided in Table II. The impact of a channel in this situation is analogous to that described just earlier. The drives that are part of the balanced portion will be evenly distributed. The remaining drives may balance close to evenly, or they may not. In the case of 19 drives, the new distribution will be either 6,6,7 active ports, or 7, 7, 5 if they have been properly arranged according to the rules and principles described herein. Now the impact will affect the access of the higher loaded channels more than the lesser loaded channel. For the 4-channel example, if the positions to which the disk drives are added is correctly chosen according to the rules provided here, then the difference in channel loading need not be more then 2 active ports and in most cases the difference will be one active port. Similar results, though different absolute differences will apply to other number of channel topologies.

TABLE II

Case II - Exemplary Procedure and Resulting Structures for Increasing Number of Disks to be greater than minimum number

| Number of Disk Drives | Connections on controller port 0 | Connections on controller port 1 | Connections on controller port 2 | Connections on controller port 3 |
|---|---|---|---|---|
| 13 | 4 | 3 | 3 | 3 |
| 14 | 4 | 4 | 3 | 3 |
| 15 | 4 | 4 | 4 | 3 |
| 16 | 4 | 4 | 4 | 4 |
| 17 | 5 | 4 | 4 | 4 |
| 18 | 5 | 5 | 4 | 4 |
| 19 | 5 | 5 | 5 | 4 |

Figure 15:
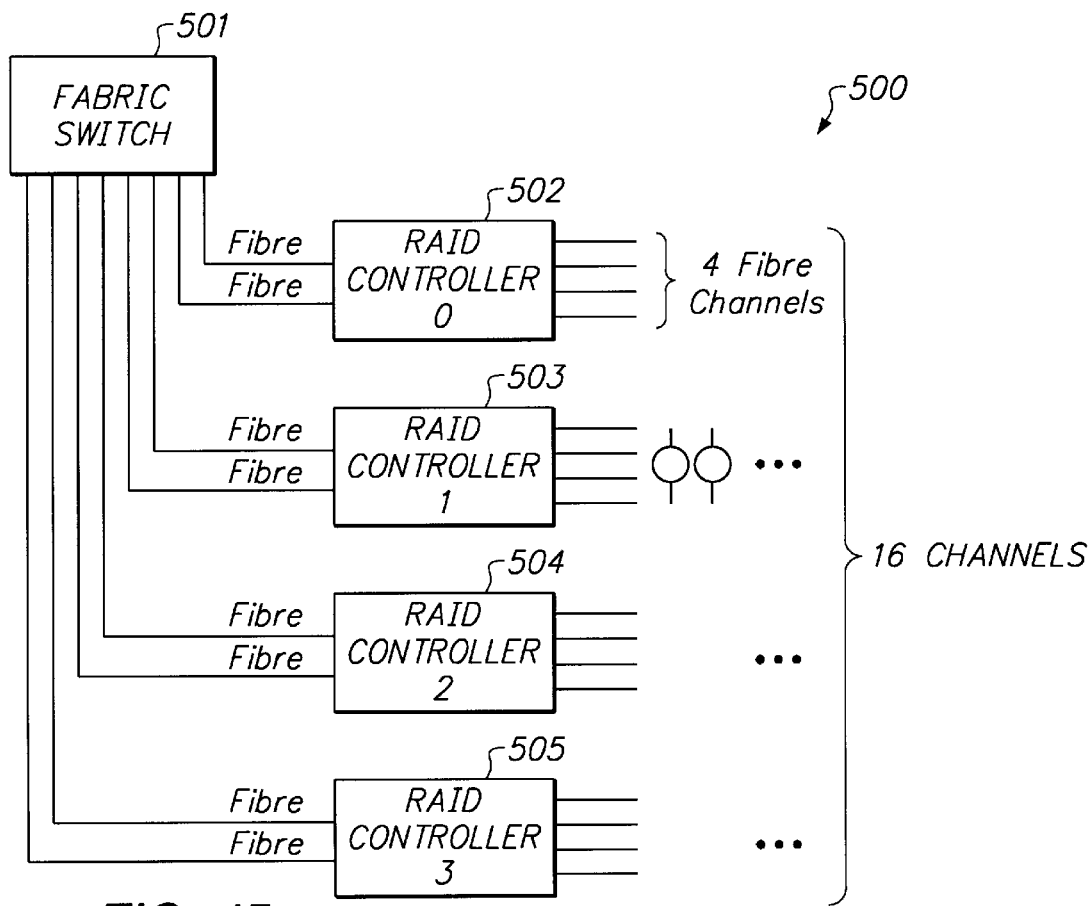
FIG. 15 shows an exemplary embodiment of the tube topology including a fabric switch and a plurality of controllers and Fibre channels.

In FIG. 15, we show a system 500 that extends the structure and method already described to include a Fabric switch or hub 501 and to a plurality of RAID controllers 502, 503, 504, 505 as well as the fiber channels and disk drives connected to the fibers as before (not shown). The series of controllers here work in concert, and the disks are connected between all the channels or the controllers in a meta-tube. If the locations of a port is identified by the matched pair (controller, channel) or (C__, ch__), then the following partial set of parameters in Table III shows the connections for some of the drives.

TABLE III

Exemplary connections for selected drives in one meta-tube embodiment.

| Disk | Port 0 | Port 1 |
|---|---|---|
| 1 | C0, ch0 | C1, ch0 |
| 2 | C0, ch1 | C1, ch1 |
| 63 | C2, ch2 | C3, ch3 |

In this example, the number of disks to balance this 16 channel system is 240 disk drives for a single active port system, and 120 disk drives for a dual active port system.

These inventive structures and method may be extended further by providing a topology having multiple dual-ported controllers configured in a tube topology. This would provide a switchable configuration having four channels and six controllers arranged in a tube. In the event of a channel failure, the load will be evenly distributed to the remaining controllers. The channels in the back end would not be connected from one controller to the next, but the drives would be in tubes on the back end.

All publications, patents, and patent applications mentioned in this specification are herein incorporated by reference to the same extent as if each individual publication or patent application was specifically and individually indicated to be incorporated by reference.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best use the invention and various embodiments with various modifications as are suited to the particular use contemplated. It is intended that the scope of the invention be defined by the claims appended hereto and their equivalents.

What is claimed is:

1. A data storage system comprising;
   a plurality (n) of information storage devices each having first and second device access ports;
   a plurality (c) of communication channels;
   a device controller controlling access by said plurality of information storage devices to said plurality of communication channels;
   at least one of said storage devices being connected via said first access port to a first one of said communication channels and via said second access port to a second one of said communication channels different from said first channel, so that said at least one storage device is accessed by said controller via either said first channel through said first port or via said second channel through said second port;
   wherein the relationship between the minimum number (n) of devices for an automatically balanced system and the number of channels (c) is defined by the equation:

$$n = m \times k \times \sum_{i=1}^{c-1} i$$

where k is a constant equal to 2 for drives having only a single active port at any time, and equal to 1 for fully-dual-ported drives, and m is an integer equal to 1 that defines the minimum number of devices for redundant balanced operations and equal to an integer greater than 1 for redundant load balanced operation and higher storage capacity.

2. A storage system comprising:
   a plurality of disk drives, each said disk drive having a normally active port and a normally inactive port;
   at least one controller for controlling communication with said plurality of disk drives via said normally active ports and under a predetermined condition via said normally inactive ports;
   a plurality of communication channels extending between and coupling said at least one controller and said normally active and said normally inactive ports of said plurality of disk drives; and
   said plurality of communication channels arranged in a tube topology and coupling said plurality of disk drives to said controller so that in the event that one of said plurality of communications channels fails, disk access loading is evenly and automatically redistributed between non-failed ones of said plurality of communications channels.

3. The storage system in claim 2, wherein said predetermined condition comprises a failure of one of said communications channels coupling to said normally active port of said disk drive.

4. The storage system in claim 2, wherein each said communications channel is selected from the group consisting of a Fibre communications channel, a HIPPIE communications channel, a Fire Wire communications channel, a SCSI communications channel, and combinations thereof.

5. The storage system in claim 2, wherein said storage system comprises a Redundant Array of Independent Disk (RAID) storage system.

6. The storage system in claim 2, wherein said storage system comprises a Level 3 RAID system (RAID3).

7. The storage system in claim 2, wherein said storage system comprises a Level 5 RAID system (RAID5).

8. A storage system comprising:
   a plurality of dual-ported storage devices, each said dual-ported storage device having a first port and a second port;
   a controller having a first plurality of primary controller ports and at least one secondary controller port, said first plurality of primary controller ports having at least three primary controller ports including a first Fiber channel port, a second Fiber channel port and a third Fiber channel port, and said at least one secondary controller port including a secondary Fibre channel port;
   each said primary controller port coupled to said first ports of at least two of said plurality of dual-ported storage devices to form a plurality of primary communications channel loops;
   said secondary controller ports coupled to said second port of each of said plurality of dual-ported storage devices to form a secondary communications channel loop; and
   each of said plurality of dual-ported storage devices being coupled to said controller by a first communication channel extending from said first port to at least one of said first plurality of primary controller ports, and by a second communication channel extending from said second port to said secondary Fiber channel port.

9. The storage system in claim 8, wherein during operation when each of said primary communications channel loops are operating, communications from said controller to said storage devices being distributed substantially evenly across said plurality of primary communications channel loops; and during operation when one of said primary communications channel loops are not operating, communications from said controller to one of said storage devices coupled to said non-operating primary communications channel loop being provided by said secondary communications channel loop which becomes an active loop upon the non-operation of said primary communications channel loop.

10. The storage system in claim 8, wherein said first communication channel and said second communication channel and said second communication channel are selected from the group consisting of a Fibre communications channel, a HIPPIE communications channel, a Fire Wire communications channel, a SCSI communications channel, and combinations thereof.

11. The storage system in claim 8, wherein said first communication channel and said second communication channel are Fibre communications channel and said second communication channel.

12. The storage system in claim 8, wherein said storage system comprises a Redundant Array of Independent Disk (RAID) storage system and at least one of said storage devices comprise at least one hard disk drive.

13. The storage system in claim 8, wherein:
   said first storage device port comprises a normally active storage device port, and said second storage device port comprises a normally inactive storage device port; and
   said first plurality of primary controller ports comprise a first plurality of normally active controller ports, and said at least one secondary controller port comprises a normally inactive controller port.

14. The storage system in claim 8, wherein:
said plurality of dual-ported storage devices comprise at least six storage devices including a first disk drive, a second disk drive, a third disk drive, a fourth disk drive, a fifth disk drive, and a sixth disk drive;
said first Fibre channel port connected to said first and said second disk drives, said second Fibre channel port connected to said third and said fourth disk drives, said third Fibre channel port connected to said fifth and said sixth disk drives; and
said secondary Fibre channel port being connected to said normally inactive port of said first disk drive, said second disk drive, said third disk drive, said fourth disk drive, said fifth disk drive, said sixth disk drive.

15. A storage system having failed communication channel protection, said storage system comprising:
a level 4 RAID system having first, second, and third data disk drives for storing data and a fourth parity disk drive for storing parity of the data stored on said first, second, and third data disk drives;
said first, second, and third data disk drives, and fourth parity disk drive striped across different channels;
a controller having a plurality of channels, each said channel being coupled to one normally active-port of one of said disk drives and to one normally-inactive ports on a different one of said disk drives;
each said disk drive being accessible during normal operation through said normally-active ports and being accessible through said normally-inactive ports in the event that one of said channels or one of said ports becomes inoperative; and
each said first, second third, and fourth disks remaining accessible via its respective normally-inactive port and said in the event that one of said channels coupling each said disk drive to said controller fails.

16. The storage system in claim 15, wherein
coupling of each said disk drive to said controller via said normally-inactive port provides better performance than a conventional 3+1 RAID Level 4 system in which each said disk drive is coupled only to said normally-active port because no data reconstruction is needed in the event of failure of said normally-active port, only potential degradation in performance resulting from two disk drives sharing a common channel occurring.

17. The storage system in claim 16, wherein each of said disk drives is a dual-ported drive; and each said port is a Fibre channel port.

18. A multiple-RAID3 storage system loop topology interconnect structure comprising:
first (261), second (262), third (263), and fourth (264) Fiber channels coupled respectively to first (265), second (266), third (267), and fourth (268) RAID controller Fibre ports;
each said fibre channel being coupled to a normally active disk drive port of a first set of RAID3 disks (271), a second set of RAID3 disks (272), a third set of RAID3 disks (273), and a fourth set of RAID3 disks (274), respectively;
each of the fiber channels is also coupled to a normally inactive disk drive port of a set of RAID3 disk drives different from said first, second, third, and fourth sets of RAID3 disks in wrap-around fashion such that first fibre channel (261) is also coupled to said second RAID3 (272), second fibre channel (262) is also connected to said third RAID3 set (273), third fibre channel (263) is also connected to said fourth RAID3 set (274), and fourth Fibre channel (264) is also connected to said first RAID3 set (271); and
each said RAID3 disk set (271, 272, 273, 274) having said normally active set of disk drive ports coupled to one Fibre channel and said normally inactive disk drive ports coupled to a different Fibre channel.

19. The multiple-RAID3 storage system loop topology in claim 18, wherein said multiple-RAID3 storage system comprises a plurality of disk drives configured such that large amounts of data can be written in parallel to all the disks without requiring the parity to be modified.

20. The multiple-RAID3 storage system loop topology in claim 18, further comprising a multi-channel Fibre controller, and wherein multiple RAID3 arrays are coupled to said multi-channel Fibre controller so that the activity occurring one RAID3 array does not interfere with the operation on the RAID3 arrays.

21. The multiple-RAID3 storage system loop topology interconnect structure in claim 18, wherein distribution of communications with said RAID3 disks is over a single Fibre channel communication path.

22. The multiple-RAID3 storage system loop topology interconnect structure in claim 21, wherein for a storage system having multiple channels all of a particular related set of RAID3 disk drives are placed on a single channel so that only one channel is tied up during the RAID3 transaction.

23. A multiple-RAID5 storage system loop topology interconnect structure comprising:
first (281), second (282), third (283), and fourth (284) Fiber channels coupled respectively to first (285), second (286), third (287), and fourth (288) RAID controller Fibre ports;
each said fibre channel being coupled to a normally active disk drive port of a first set of RAID5 disks (291), a second set of RAID5 disks (292), a third set of RAID5 disks (293), and a fourth set of RAID5 disks (294) respectively; and
said interconnection topology also providing a connection of each of said fiber channels to the normally-inactive disk drive port of a different RAID5 disk drive set in wrap-around fashion wherein a common Fibre channel connects across a plurality of disk drives associated with different RAID5 sets.

24. The multiple-RAID5 storage system loop topology interconnect structure in claim 23, wherein: each said disk in a RAID5 disk set has its normally active port coupled to different one of said Fibre channels and the normally inactive port coupled to Fibre channels different from said active port.

25. The multiple-RAID5 storage system loop topology interconnect structure in claim 21, wherein:
said first Fibre channel (281) is coupled to the normally inactive port of a disk drive from each of said first RAID5 (291*b*), said second RAID5 set (292*b*), said third RAID5 set (293*b*), and said fourth RAID5 set (294*b*);
said second Fibre channel (282) is coupled to the normally inactive port of a disk drive from each of said first RAID5 (291*c*), said second RAID5 set (292*c*), said third RAID5 set (293*c*), and said fourth RAID5 set (294*c*);
said third Fibre channel (283) is coupled to the normally inactive port of a disk drive from each of said first RAID5 (291*d*), said second RAID5 set (292*d*), said third RAID5 set (293*d*), and said fourth RAID5 set (294*d*); and said fourth Fibre channel (284) is coupled to the normally inactive port of a disk drive from each of said first RAID5 (291*a*), said second RAID5 set (292*a*), said third RAID5 set (293*a*), and said fourth RAID5 set (294*a*).

26. The multiple-RAID5 storage system loop topology interconnect structure in claim 23, wherein for a storage system having multiple channels all of a particular related set of RAID5 disk drives are placed on different channels so that simultaneous access to the disks is achieved in order to support multiple processes on a host computer concurrently accessing data in different locations of the file system.

27. The multiple-RAID5 storage system loop topology interconnect structure in claim 26, wherein said channel is a Fibre channel, and each said disk drive is a dual-port and dual-access disk drive.

28. A mixed RAID3 and RAID5 storage system loop topology interconnect structure comprising:
- a RAID3 disk array storage subsystem;
- a RAID5 disk array storage subsystem;
- a first Fiber channel loop coupled to normally-active ports of said RAID3 storage subsystem and to normally-inactive ports of said RAID5 storage subsystem;
- a second Fiber channel loop coupled to normally-active ports of said RAID5 storage subsystem and to normally-inactive ports of said RAID3 storage subsystem; and
- said first Fibre loop for said RAID3 storage subsystem being the back-up communications channel for said RAID5 storage subsystem, and said second Fibre loop for said RAID5 storage subsystem being the back-up communications channel for said RAID3 storage subsystem.

29. A method of coupling a plurality of multi-ported information storage elements having a normally active port and a normally inactive port, to provide redundant access and dynamic automatic channel load shifting and leveling, said method comprising:
- coupling each said normally active port and said normally inactive port of said plurality of said multi-ported information storage elements to a separate channel selected from a plurality of substantially independent communication channels arranged in a tube topology such that failure of a single channel does not decouple any one of said multi-ported information storage elements from an input/output controller; and
- coupling multiple controllers to all of said multi-ported information storage elements so that in the event of a failure of one particular controller, each of said multi-ported information storage elements are accessible through a different one of said multiple controllers.

30. The method in claim 29, further comprising:
- providing a cache in each of said multiple controllers and coupling said caches so that each controller has access to the cache of each other of said controllers.

* * * * *